United States Patent
Wendt et al.

(10) Patent No.: US 10,087,986 B2
(45) Date of Patent: Oct. 2, 2018

(54) TEMPERATURE COMPENSATION RING AS WELL AS BEARING RING WITH THE TEMPERATURE COMPENSATION RING

(71) Applicants: Volker Wendt, Uechtelhausen/Zell (DE); Rico Dittmar, Schweinfurt (DE)

(72) Inventors: Volker Wendt, Uechtelhausen/Zell (DE); Rico Dittmar, Schweinfurt (DE)

(73) Assignee: AKTIEBOLAGET SKF, Gothenburg (SE)

(*) Notice: Subject to any disclaimer, the term of this patent is extended or adjusted under 35 U.S.C. 154(b) by 3 days.

(21) Appl. No.: 15/296,543

(22) Filed: Oct. 18, 2016

(65) Prior Publication Data

US 2018/0106293 A1 Apr. 19, 2018

(51) Int. Cl.
| | |
|---|---|
| F16C 19/52 | (2006.01) |
| F16C 35/07 | (2006.01) |
| F16C 25/08 | (2006.01) |
| F16C 33/10 | (2006.01) |

(52) U.S. Cl.
CPC .......... *F16C 19/525* (2013.01); *F16C 25/083* (2013.01); *F16C 33/10* (2013.01); *F16C 35/07* (2013.01); *F16C 2202/20* (2013.01); *F16C 2208/10* (2013.01); *F16C 2223/30* (2013.01)

(58) Field of Classification Search
CPC ...... F16C 19/24; F16C 19/525; F16C 25/083; F16C 33/10; F16C 35/07; F16C 33/6603; F16C 2208/10; F16C 2202/20; F16C 2223/30
USPC ........ 384/462, 493, 557, 576, 569, 606, 905
See application file for complete search history.

(56) References Cited

U.S. PATENT DOCUMENTS

| | | | | |
|---|---|---|---|---|
| 2,141,145 A | * | 12/1938 | Wooler ................. | F16C 19/385 16/107 |
| 2,700,581 A | * | 1/1955 | Migny ................. | F16D 1/0835 384/278 |
| 2,859,033 A | * | 11/1958 | Rose ..................... | F16C 27/066 267/153 |
| 3,728,546 A | * | 4/1973 | Desvignes .............. | G01S 3/783 250/338.1 |
| 4,569,602 A | * | 2/1986 | Lundgren ............. | F16C 13/006 384/499 |
| 4,963,041 A | * | 10/1990 | Sowards ................. | F01C 21/02 384/454 |
| 5,073,039 A | * | 12/1991 | Shervington ......... | F16C 19/525 384/278 |

(Continued)

FOREIGN PATENT DOCUMENTS

| | | | | |
|---|---|---|---|---|
| DE | 102005043954 A1 | * | 3/2007 | ............. F16C 19/26 |
| DE | 102010052842 A1 | * | 5/2012 | ............ F16C 19/364 |

(Continued)

*Primary Examiner* — Marcus Charles
(74) *Attorney, Agent, or Firm* — Bryan Peckjian; SKF USA Inc. Patent Dept.

(57) ABSTRACT

A temperature compensation ring configured to compensate for a temperature-dependent distance change between two components includes a base body made from an elastic material, and at least a section of at least one surface of the base body is configured to reduce a friction in the axial direction between the temperature compensation ring and an abutment surface, by, for example, being coated with a friction reducing coating and/or by including one or more grooves for receiving a lubricant.

18 Claims, 5 Drawing Sheets

(56) References Cited

U.S. PATENT DOCUMENTS

| | | | | |
|---|---|---|---|---|
| 5,562,349 A * | 10/1996 | Nespodzany, Jr. | ... | F16C 19/525 384/493 |
| 5,585,682 A * | 12/1996 | Konicek | ... | H02K 1/185 310/216.114 |
| 5,857,782 A * | 1/1999 | Waskiewicz | ... | F16C 23/084 384/493 |
| 6,135,641 A * | 10/2000 | Smith | ... | F16C 19/163 384/493 |
| 6,273,614 B1 * | 8/2001 | Nicot | ... | F16C 19/163 384/493 |
| 8,591,120 B2 * | 11/2013 | Ince | ... | F16C 25/08 384/493 |
| 8,684,608 B2 * | 4/2014 | Ince | ... | F16C 19/182 384/493 |
| 8,690,445 B2 * | 4/2014 | Doerrfuss | ... | F16C 19/163 384/493 |
| 8,696,206 B2 * | 4/2014 | Lunz | ... | F16C 19/364 384/563 |
| 8,905,643 B2 * | 12/2014 | Ince | ... | F16C 35/073 384/493 |
| 9,222,508 B2 * | 12/2015 | Brown | ... | F16C 19/364 |
| 2009/0080824 A1 * | 3/2009 | Joki | ... | F16C 25/08 384/557 |
| 2009/0202188 A1 * | 8/2009 | Fox | ... | F16C 19/548 384/557 |
| 2012/0195537 A1 * | 8/2012 | Ince | ... | F16C 35/073 384/493 |
| 2015/0117807 A1 * | 4/2015 | Spies | ... | F16C 33/586 384/476 |
| 2015/0308504 A1 * | 10/2015 | Katsaros | ... | F16C 25/08 384/125 |

FOREIGN PATENT DOCUMENTS

| | | | | |
|---|---|---|---|---|
| DE | 102012221718 A1 * | 5/2014 | ............ | F16C 27/04 |
| JP | 2007100792 A * | 4/2007 | ............ | F16C 25/083 |
| WO | WO-2009040172 A1 * | 4/2009 | ............ | F16C 25/08 |

* cited by examiner

TEMPERATURE COMPENSATION RING AS WELL AS BEARING RING WITH THE TEMPERATURE COMPENSATION RING

TECHNOLOGICAL FIELD

Exemplary embodiments relate to a temperature compensation ring, which is designed to compensate for a temperature-dependent distance between two components, as well as a bearing ring with the temperature compensation ring.

BACKGROUND

Many components, for example, bearings, are exposed to different temperature conditions. In some cases the bearing or components of the bearing are disposed on components that behave differently with a change in temperature than the bearing or a component of the bearing. For example, with a temperature change the components can expand or deform differently from one another. This can be the case, for example, with rolling-element bearings that are used in an aluminum housing, but also with other bearings. Therefore with such rolling-element bearings in such cases, elements for compensating for the different thermal expansions of aluminum housings, steel shafts and bearings can be introduced between the rolling-element bearing ring and the housing.

There are conventional rolling-element bearings which include a flange on an outer ring. With some conventional outer rings, an elastomer ring is disposed adjacent to the flange as an element for temperature compensation. For this purpose the elastomer ring is pushed onto the outer ring, for example. The elastomer ring has a very high thermal expansion coefficient. If the shafts and the housing expand at different rates, the elastomer ring should expand at such a rate that, at least in the axial direction, a desired bearing setting in clearance or preload is maintained between the housing and the outer ring. This can happen, for example, with a temperature increase or change. The elastomer ring should thus compensate for a clearance increase or a preload reduction, which can arise, for example, at an operating temperature.

In order that the outer ring can be moved in the housing, a clearance is often provided between the outer ring and the housing. Conventional elastomer rings, under appropriate operating load, often behave as a fluid. With a load the material can thus also be urged into the two gaps between the housing and the outer ring, which can also be configured as a flange outer ring. This process can be referred to as gap extrusion. Under unfavorable conditions with a mechanically alternating load the temperature compensation ring can fray at an affected edge. A material loss can possibly thereby possibly result. This material loss can possibly reduce a length compensation capability of the temperature compensation ring or of a temperature compensation bearing and disadvantageously change a bearing setting. This is undesirable and under certain circumstances can even occur with temperature compensation rings that are disposed between components other than the bearing ring and the housing.

SUMMARY

There is therefore a need to improve a temperature compensation ring such that the above-described gap extrusion can at least be reduced or even avoided.

Exemplary embodiments relate to a temperature compensation ring that is configured to compensate for a temperature-dependent distance between two components. The temperature compensation ring includes a base body made from an elastic material. A surface of the base body is configured, at least sectionally, to reduce a friction in the axial direction between the temperature compensation ring and an abutment surface on which the temperature compensation ring abuts. In some exemplary embodiments a gap extrusion can be prevented from occurring. This can be made possible, for example, since a part of the material of the temperature compensation ring is prevented from being urged into a gap between the housing and the bearing ring. The gap can, for example, be disposed parallel to a radial direction.

Any elastic component, for example, that is configured to change more in its volume than the bearing ring or another adjacent component, can serve as temperature compensation ring. For example, the temperature compensation ring can have an annular shape. The components can be, for example, a bearing ring and a housing. The housing can be manufactured, for example, from aluminum. A material of the bearing ring can be, for example, a steel or another material that changes less in its volume in a temperature-dependent manner than aluminum. The base body of the temperature compensation ring can be, for example, the component that the elastic material comprises. The elastic material can be, for example, fluoro rubber (FKM), hydrogenated nitrile butadiene rubber (HNBR), a fluoroelastomer (for example, with the trade name "Viton"), acrylic rubber (ACM), an elastomer, and/or another rubber-type material. A compensating of a distance change can be present, for example, when the temperature compensation ring expands exactly as much as or more than a spacing between two components so that the spacing is filled by the temperature compensation ring instead of with air or with another medium.

The base body can have, for example, an essentially rectangular cross-section. The abutment surface on which the temperature compensation ring abuts with its surface can be, for example, a surface of the bearing ring and/or a surface of the bearing housing. The abutment surface can possibly be a surface facing in a radial direction, for example, radially inward and/or radially outward. A friction in the axial direction can be, for example, a coefficient of friction or a frictional force that must be overcome in order to displace the temperature compensation ring along or parallel to the axial direction of the abutment surface.

The surface can completely have the different properties with respect to friction or the coefficient of friction or only on the surfaces facing in the radial direction. A structure reducing the frictional force can be fully but also only sectionally provided on the surfaces facing in the radial direction. The surface sides of the temperature compensation ring or of the base body, which surface sides face in the axial direction, can possibly have the material and/or a coefficient of friction of the base body. Additionally or alternatively the abutment surface on which the temperature compensation ring abuts in its installed position can also include a means which can reduce the friction.

In some exemplary embodiments the temperature compensation ring can include a coating at least sectionally on its surface, which coating has a smaller coefficient of friction with the abutment surface than a material of the base body with the abutment surface. In some exemplary embodiments a lower friction in the axial direction can thus be achieved in a simple manner. The coating here can be applied completely on the entire surface of the base body or only sectionally, for example, only be applied on the surfaces facing in the radial direction. The coating can possibly only be in coating sections. Adjacent coating sections can, for example, be spaced in the axial direction by non-coated sections. Additionally or alternatively the coating can be disposed completely along the temperature compensation ring in the circumferential direction. The coating can be a material, for example, that differs from a material of the base body, for example, a plastic, PTFE, ceramic, graphite, and/or the like. Under certain circumstances the coating can also be achieved by a special surface treatment of the base body, for example, heating, plasma treating, grinding, or the like. The coating can optionally be very thin in comparison to an extension of the base body in the radial direction. For example, a thickness of the coating can be at most 10%, 5%, 2%, 1%, 0.5%, 0.1%, or 0.005% of a radial extension of the base body.

Additionally or alternatively the temperature compensation ring can include on its surface at least one groove, which is configured to receive a lubricant. In some exemplary embodiments a lubricant film can thereby be built up between the temperature compensation ring and the abutment surface, whereby a friction between the abutment surface and the temperature compensation ring in the axial direction can possibly be reduced. The groove can be, for example, a depression extending in the circumferential direction on a side of the temperature compensation ring facing in the radial direction. The groove can extend, for example, by 360°, about the temperature compensation ring in the circumferential direction. A depth and/or a width of the groove can be small, for example, in comparison to a radial and/or axial extension of the temperature compensation ring. For example, the depth and/or the width of the groove can correspond to at most 25%, 15%, 12%, 10%, 8%, 6%, 5%, 3%, or 1% of an extension of the temperature compensation ring in the radial and/or the axial direction. For example, the groove can be rectangular, square, semi-circular, U-shaped, or the like in its cross-section. In some exemplary embodiments the groove can be free of other media or objects and only filled with lubricant. The lubricant can be, for example, a liquid-type, pasty-type, solid-type, and/or powder-type medium, for example, oil, water, grease, graphite powder, and/or the like.

Additionally or alternatively the groove and/or the coating that is located on the temperature compensation ring or the coating section can be disposed at least in one region at which a gap is located between a bearing ring and a housing on which the bearing ring is disposed in an assembled state. In some exemplary embodiments the friction can thus be decreased above all in a dynamically loaded region of the temperature compensation ring. The regions in which the gap forms are regions wherein the bearing ring impinges on the housing. Depending on the shape of the bearing ring, for example, with and/or without flange and shape of the housing these regions can lie on edges of the temperature compensation ring opposing each other in the diagonal direction.

In the axial direction the groove and/or the coating can be disposed as friction-reducing structures, for example, inside a section that extends away in the axial direction from an end edge of the temperature compensation ring less than 5%, 10%, 15%, 20%, 30%, and/or more than 2%, 3%, 5%, or 10% of a total extension of the temperature compensation ring. In some exemplary embodiments it can thus be made possible that the friction exactly in a region wherein the temperature compensation ring is dynamically loaded has reduced friction with a movement in the axial direction.

Additionally or alternatively the temperature compensation ring can include at least two grooves and/or two coating sections that are disposed spaced from each other in the axial direction. The plurality of grooves or coating sections here can be disposed on the same surface facing in the radial direction.

Additionally or alternatively the at least one groove can also be disposed in a strengthening body that can also be referred to as support ring. The strengthening body can include a harder material than the base body. In some exemplary embodiments it can thereby be made possible that a deforming of the groove is at least reduced or even prevented. Under certain circumstances the lubricant can thus be better held in the groove. As material the strengthening body can include, for example, a plastic, a polymer, or a metal that is harder than the material of the base body. The strengthening body can be, for example, a ring disposed in the circumferential direction. For example, the strengthening body can be disposed in a region wherein the housing impinges on the bearing ring. The base body can possibly include a recess in the shape of the strengthening body. For example the strengthening body and/or the recess can have a rectangular or a square cross-section.

Exemplary embodiments also relate to a temperature compensation ring that includes, in addition to the base body made from an elastic material, at least one strengthening body that is manufactured from a metallic material or a polymer. The strengthening body is configured to at least partially form opposing side surfaces of the temperature compensation ring. In some exemplary embodiments it can thus be made possible that the temperature compensation ring is prevented by the reinforcing region from extruding into the gap.

In some exemplary embodiments the strengthening body can be a spring, for example, a coil spring. Windings of the spring can extend, for example, in the circumferential direction. The windings disposed in the circumferential direction here can deviate by a small amount, for example at most 0.1°, 0.5°, 1°, 1.5°, 2°, or 5° from the circumferential direction in order to form the spiral shape. In some exemplary embodiments since the strengthening body is configured as a spring, a manufacturing of the temperature compensation ring can be facilitated. For example, the temperature compensation ring can be inserted as a spring in a mold which is then overmolded with the elastic material of the base body. Here the spring can be shaped such that one or two windings are disposed in opposing corners of the temperature compensation ring and reinforce it in order to prevent the gap extrusion.

Exemplary embodiments also relate to a temperature compensation ring that includes a strengthening body that is configured as a spring. In some exemplary embodiments the spring can also be manufactured from a plastic.

Exemplary embodiments also relate to a bearing ring with a temperature compensation ring according to one of the preceding exemplary embodiments. Depending on which temperature compensation ring is disposed on the bearing ring, here, for example, either the coating and/or the lubricant that is received in the grooves and/or the strengthening body can be sectionally in contact with the bearing ring.

The exemplary embodiments and their individual features disclosed in the above description, the following claims, and the accompanying Figures can be meaningful and implemented both individually and in any combination for the realization of an exemplary embodiment in its various designs. The Figures thus schematically show the following views.

DETAILED DESCRIPTION

In the following description of the accompanying Figures, like reference numbers refer to like or comparable components. Furthermore, summarizing reference numbers are used for components and objects that appear multiple times in an exemplary embodiment or in an illustration, but that are described together in terms of one or more common features. Components or objects that are described with the same or summarizing reference numbers can be embodied identically, but also optionally differently, in terms of individual, multiple, or all features, their dimensions, for example, as long as the description does not explicitly or implicitly indicate otherwise.

According to exemplary embodiments, under certain circumstances the temperature compensation ring can also be referred to as a positioning elastomer in a temperature-compensated support bearing or in a temperature-compensated support bearing assembly. Conventional temperature compensation rings for temperature-dependent, axial displacing of bearing rings have shown in tests, for example, that under certain circumstances due to a movement or a displacement caused by a sliding fit, temperature compensation rings can be subjected to increased wear and thus material removal in a region where they are adjacent to fit surfaces. Under unfavorable conditions this material removal can reduce or completely cancel a function of the temperature compensation ring. How strongly the function is reduced can be dependent, for example, on operating conditions and/or loads and load changes.

In order to improve the temperature compensation ring, in some exemplary embodiments a static friction of a material of the temperature compensation ring, for example, an elastomer of the temperature compensation ring can be reduced at a dynamically impinged transition to a bearing seat. This can be effected, for example, by coating the temperature compensation ring with a coating to reduce the sliding friction. In other exemplary embodiments grooves can be provided on a surface of the temperature compensation ring, which grooves are configured to hold a lubricant ready in a targeted manner in the dynamically impinged region which region can also be referred to as the movement region. Instead of the grooves, grease filled notches can also be disposed in the movement regions.

Figure 1:
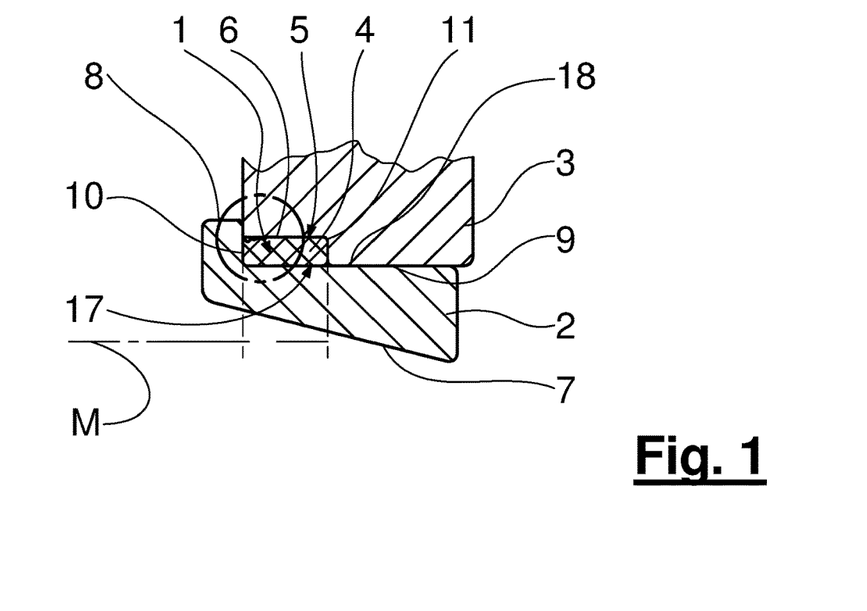
FIG. 1 shows a schematic depiction of a sectional view of a temperature compensation ring according to an exemplary embodiment.

For example, FIG. 1 shows such a temperature compensation ring 1 that is configured to compensate for a temperature-dependent spacing between two components 2 and 3. The temperature compensation ring 1 comprises a base body 4. The base body 4 is manufactured from an elastic material. A surface 5 of the base body 4 is at least sectionally configured to reduce a friction in axial direction M between the temperature compensation ring 1 and an abutment surface 6 on which the temperature compensation ring 1 can abut.

The component 2 is an outer ring of a tapered roller bearing. For this purpose the outer bearing ring 2 includes on its radially inwardly facing side an oblique raceway 7 for a plurality of tapered rollers. In some exemplary embodiments other types of bearings, for example, angular contact ball bearings or ball bearings can also include the temperature compensation ring and thereby possibly be optimized in their adjustment. The bearing ring 2 includes a flange 8 on its radially outwardly facing side. The flange 8 has a larger diameter than a section 9 of the bearing ring 2, which section 9 is adjacent in the axial direction. An end surface 10, which is facing in the axial direction M, thereby results between the flange 8 and the section 9. The temperature compensation ring 1 at least sectionally abuts in the axial direction on the end surface 10, and in the radial direction on the section 9. The second component 3 is a part of the housing not depicted in more detail. The housing comprises a section 11 that essentially has the dimensions of the temperature compensation ring 1 and in which the temperature compensation ring 1 is disposed.

Figure 2:
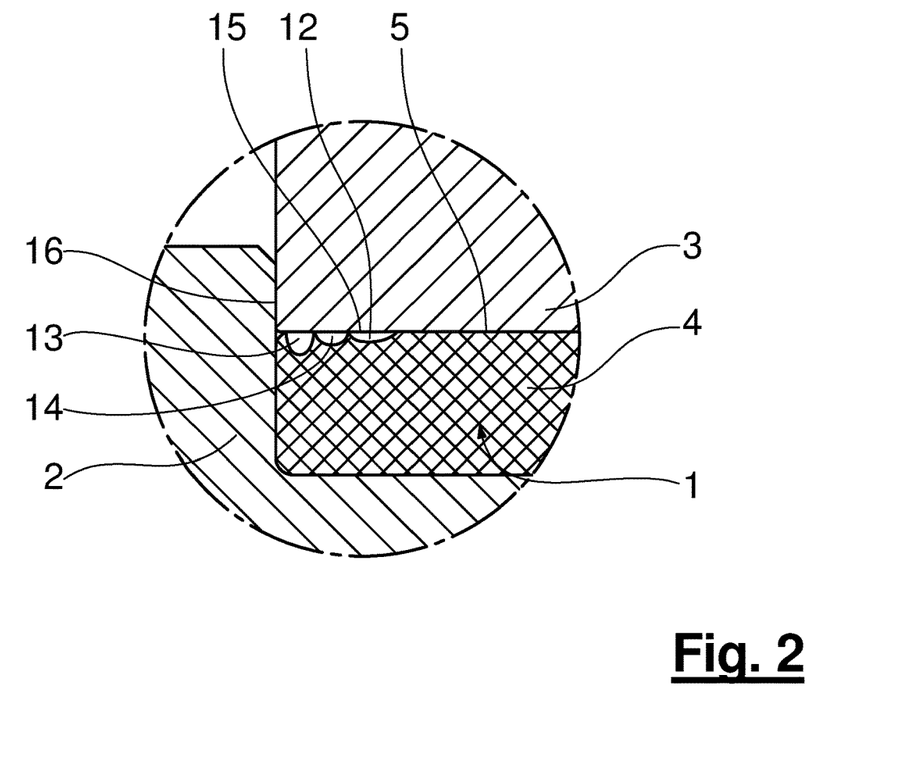
FIG. 2 shows a schematic depiction of an enlarged section of FIG. 1.

As can be seen in the enlarged depiction of FIG. 2, three grooves 13, 14, and 15 are provided on a radially outwardly facing surface 12 of the temperature compensation ring 1 or its base body 4. The grooves 13, 14, and 15 have a semicircular cross-section. The grooves 13, 14, and 15 are each recessed with respect to the radially outwardly facing surface 12 or a surface 5 of the temperature compensation ring 1. In the radial direction, the groove 13 has a greater extension than the groove 14; that is, the groove 13 is radially deeper than the groove 14. In the radial direction the groove 14 has a greater extension than the groove 15. In axial direction M the three grooves 13, 14, and 15 have the same extension. The grooves 13, 14, and 15 here are disposed in a region of the radially outwardly facing surface 12 of the base body 4, on which surface 12 the component 3 impinges on the component 2 and a gap 16 arises between them. The gap 16 arises here at a position at which the component 2 impinges with its flange 8 in axial direction M on the component 3.

In an analogous manner grooves similar to the grooves 13, 14, and 15 can also be disposed on a radially inwardly facing surface 17, near a gap 18 at which the component 3 impinges on the component 2 in the axial direction. In some further, not-depicted exemplary embodiments the grooves can have a greater distance to one another or one, two, four, or a larger number of grooves can be provided. Optionally the at least one groove can have another cross-sectional shape, for example, triangular, square, rectangular, quadrilateral, polygonal, elliptical, irregular, or the like. Under certain circumstances all grooves can have the same depth and/or width.

Figure 3:
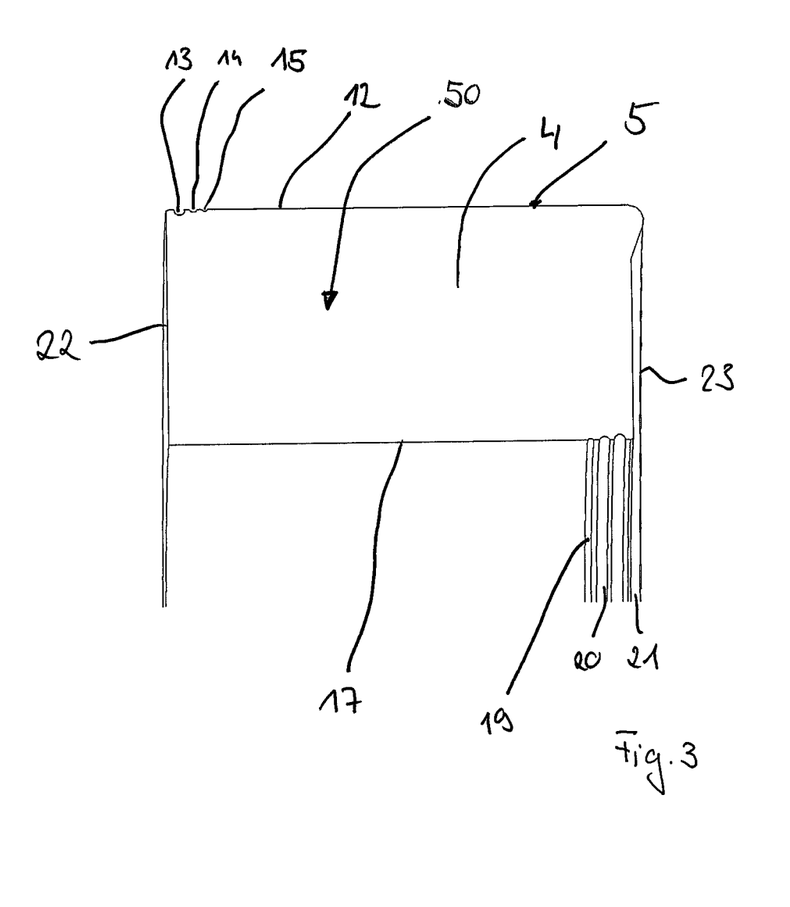
FIG. 3 shows a schematic depiction of a sectional view of a temperature compensation ring according to the exemplary embodiment of FIGS. 1 and 2.

FIG. 3 shows a further exemplary embodiment of such a temperature compensation ring 50. This is essentially similar to the temperature compensation ring 1 of the exemplary embodiment of FIGS. 1 and 2. Identical or similar components are therefore referred to with identical or similar reference numbers. The grooves 19, 20, and 21 disposed on the radially inwardly facing side 17 can be seen in the temperature compensation ring 50 of FIG. 3. In contrast to the exemplary embodiment of FIGS. 1 and 2, the groove 13 disposed near an end surface 23 has the largest extension in the axial direction and the largest extension in the radial direction. The central groove 14 has a smaller extension in the radial and axial direction than the groove 13. The groove 15 spaced farthest from the end edge 22 has a smaller extension in the axial and in the radial direction than the grooves 14 and 13. However, the groove 14 has a larger extension in the radial and in the axial direction than the groove 15. This applies in an analogous manner for the grooves 19 and 21 wherein here the groove 21, which is disposed closest to the directly adjacent end edge 23, has the largest cross-section.

In other exemplary embodiments it is attempted to reduce or prevent the described gap extrusion in a different manner by preventing or reducing by a reinforcement an erosion in the loaded regions. The reinforcement can be, for example, a strengthening or a strengthening body with another material. For this purpose, in addition to the base body made from the elastic material a hard component, for example, a ring or a spring, is embedded in the temperature compensation ring directly at or near the dynamically loaded region. The strengthening body can be, for example, metal rings that are disposed in the circumferential direction. In other exemplary embodiments at least or exactly one specially wound spring, for example, a coil spring, can be used as strengthening body. The strengthening body can optionally be manufactured from a plastic.

Figure 3A:
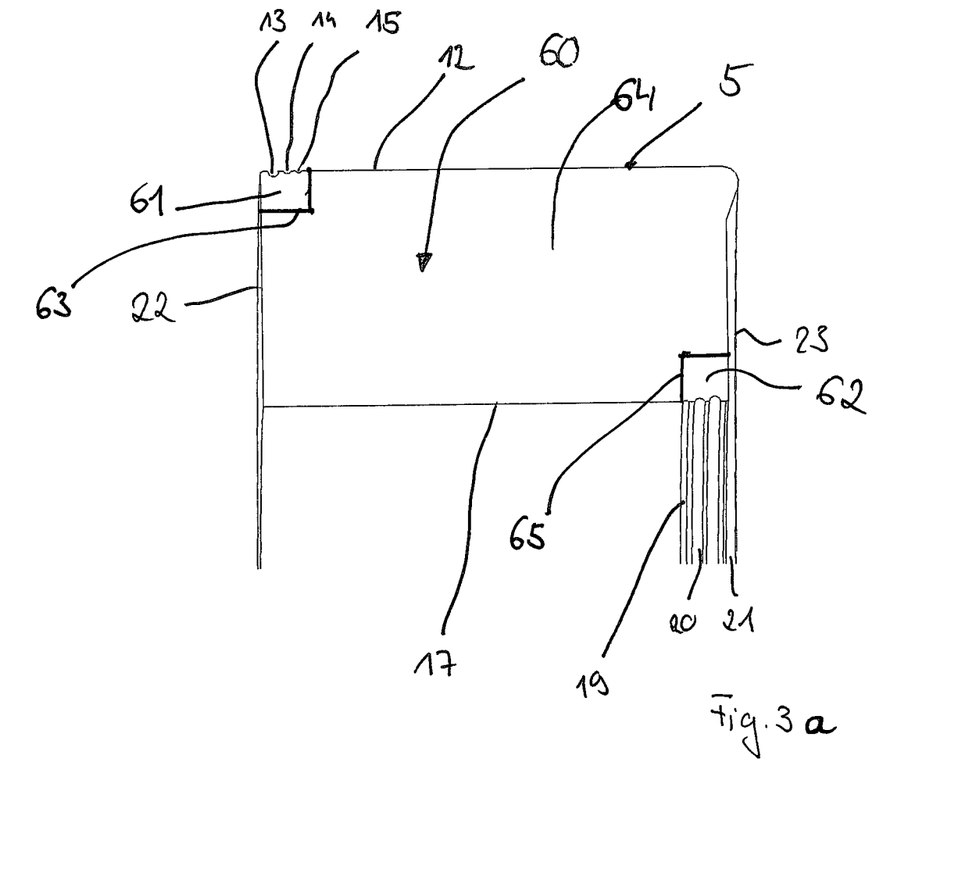
FIG. 3a shows a schematic depiction of a sectional view of a temperature compensation ring according to a further exemplary embodiment.

FIG. 3a shows a schematic depiction of a sectional view of a temperature compensation ring 60 according to a further exemplary embodiment. This is essentially similar to the temperature compensation ring 1 of the exemplary embodiment of FIGS. 1 and 2. Identical or similar components are therefore designated with identical or similar reference numbers. The temperature compensation ring 60 includes a base body 64. Viewed in cross-section the base body 64 includes two recess 63 and 65 at two edges opposing each other in the diagonal direction. The recesses 63 and 65 have a square cross-section. A strengthening body 61 and 62, which can also be referred to as a support ring, is respectively disposed in each of the openings 63 and 65. Here each of the strengthening bodies 61 and 62 is disposed such that they only sectionally form two mutually impinging side surfaces 17 and 23 or 22 and 12. Each of the strengthening bodies 61 and 62 includes on its radially inwardly facing side surface the already described grooves 12, 14, 15, 19, 20, and 21. The strengthening body 61 or 62 is manufactured from a harder material than the base body 64, for example, plastic.

Figure 4:
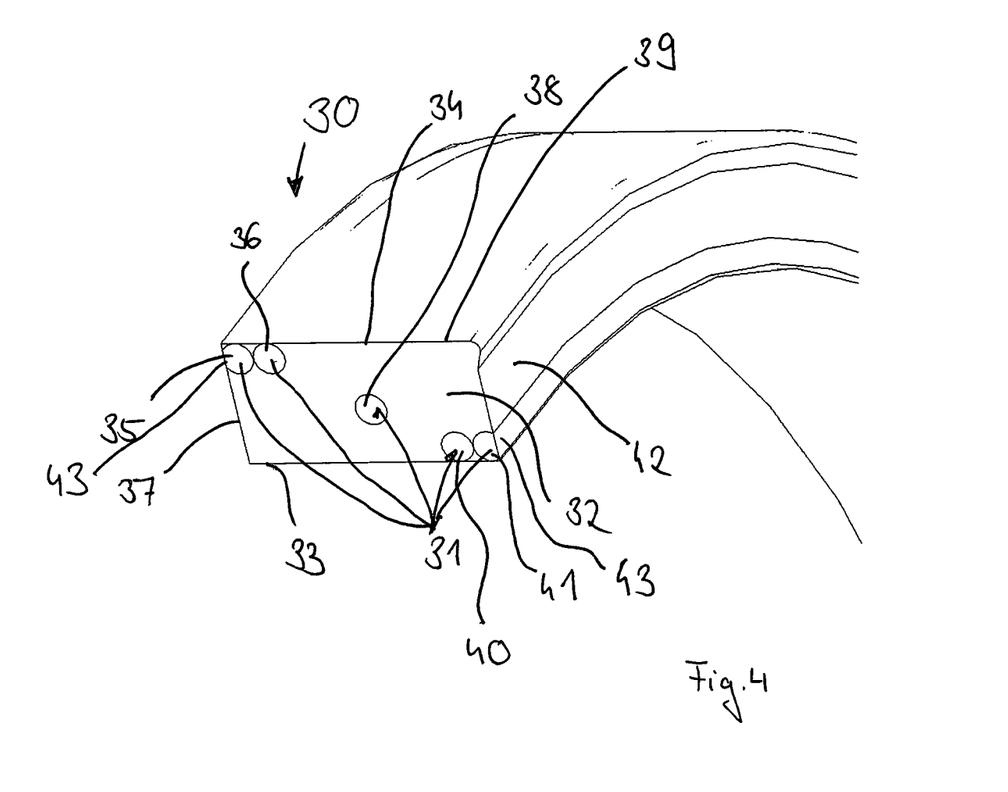
FIG. 4 shows a schematic perspective depiction of a temperature compensation ring according to a further exemplary embodiment.

FIG. 4 shows a schematic perspective depiction of a temperature compensation ring 30 according to an exemplary embodiment that is configured to compensate for a temperature-dependent spacing between two not-depicted components. The temperature compensation ring 30 could be inserted between the components 2 and 3 instead of the temperature compensation ring 1. The temperature compensation ring 30 includes a base body 32 made from an elastic material. The elastic material can be one of the materials already described. The temperature compensation ring 30 further comprises a strengthening body 31, which is manufactured from a metallic material, for example, steel or spring steel. The strengthening body 31 is configured to at least partially form opposing side surfaces 33 and 34 of the temperature compensation ring. The side surface 33 here is the radially inwardly facing surface of the temperature compensation ring 30. The side surface 34 is the radially outwardly facing surface of the temperature compensation ring 30.

Figure 5:
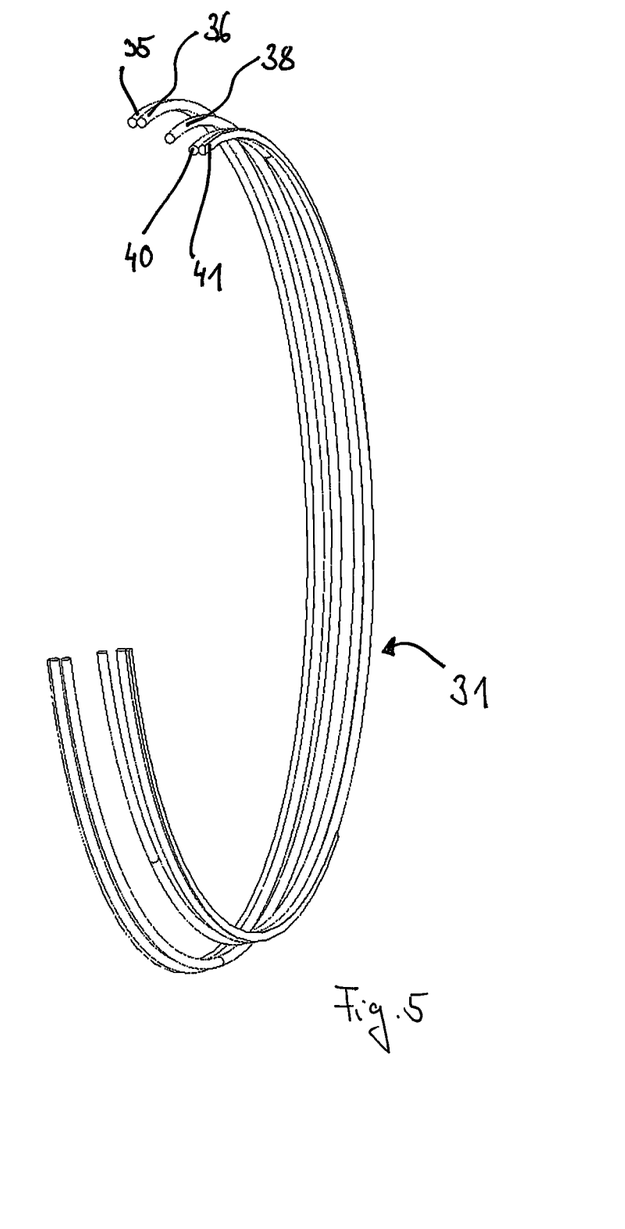
FIG. 5 shows a strengthening body for the temperature compensation ring of the exemplary embodiment of FIG. 4.

The reinforcing body 31 of the exemplary embodiment of FIG. 4 is a coil spring with a plurality of windings. The coil spring 31 is depicted in FIG. 5 without the base body 30. A first winding 35 as well as a second winding 36 directly adjacent in the axial direction are disposed on the radially outwardly facing side surface 34 such that they at least partially form the radially outwardly facing side surface 34. In the axial direction the first winding 35 at least partially represents an end side 37 facing in the axial direction M. A third winding 38 of the strengthening body 31 is disposed spaced in the axial direction from the second winding 36 and has a smaller diameter than the first two windings 35 and 36. The third winding 38 is thereby disposed essentially in a central region without contact to a surface 39 of the temperature compensation ring 30. A fourth winding 40 and a fifth winding 41 are disposed such that they at least partially form the side surface 33. Here the region between the windings 35, 36, 41, and 43, which represent the reinforcement or strengthening, can be connected by a loose-as-possible winding of spring wire, namely the winding 38. Under certain circumstances it can thereby be made possible that the central winding or the strengthening body exerts only a smallest possible and practically no influence on the adjusting function or temperature-compensation capability of the temperature compensation ring 30.

The windings of the spring wire have a circular cross-section. Only the first winding 35 and the last winding 41 that are at least partially disposed on the end sides 37 and 42 have flat surfaces 43 in axial direction M. The cross-sections of the windings disposed on the edge therefore have a shape that resembles a circle from which a circle-segment section has been removed. Optionally in other exemplary embodiments the end sides of all windings or only the end sides that at least partially represent surfaces are ground down, or a wire with a rectangular, quadrilateral, and/or square cross-section can be used in order to seal and/or optimize an axial abutment region.

In some further, not depicted exemplary embodiments another number of windings can also be provided. However, in the dynamically loaded region the reinforcing body 31 or the spring can include at least one winding that can ensure a firm termination at the end side 37 or 42 of the temperature compensation ring 30, which can also be referred to as the elastomer. The outer lying windings 35 and 41 can, for example, be in abutment at least sectionally or completely with the next adjacent winding, i.e., with the winding 36 or 40, in order to ensure an even more secure sealing. In some exemplary embodiments a strong deforming of the outer lying windings 35 and 41 can at least be reduced.

The two gaps to be sealed can be disposed at different diameters and/or disposed diagonally opposing on the cross-section of the temperature compensation ring. The cross-section can also be referred to as the elastomer cross-section. The two sides of the strengthening body, which can also be referred to as the spring, can have an identical but mirrored design so that one side has a larger diameter than the other.

In a further not-depicted exemplary embodiment rings that are connected in the axial direction by flexible and/or thin bridges can be used instead of the spring. These rings can possibly also be manufactured from a plastic. The spring can be manufactured, for example, from a metal, a spring steel or the like. Since the strengthening body 31 or also other strengthening bodies are a one-piece component, in some exemplary embodiments a handling and/or a positioning during manufacturing can be simplified. In some exemplary embodiments only one component need be placed in an injection molding tool or a vulcanization tool.

In some exemplary embodiments the steel spring or the strengthening body can be inserted in a shaping tool in a similar manner to reinforcing metal plates of cassette seals. Furthermore, the reinforcing body or the spring can offer the possibility of automated or economical manufacturing. In some exemplary embodiments the spring includes an excess and thus ensures that in the tool it can securely assume the required position, for example by a slight preload. For manufacturing, the strengthening body can, for example, be treated with a bonding agent in order to thus produce a secure connection with the material of the base body. In addition, under certain circumstances an intermediate area between a to-be-reinforced dynamic region can be implemented in such a weak manner, for example, with a winding 38, that the spring can have practically no influence on the adjusting function or the temperature compensation function of the temperature compensation ring 30.

However, under certain circumstances individual rings that are not connected to one another in the axial direction except by the material of the base body 32 can be used, wherein the two sealing bodies or strengthening bodies would be positioned individually. For example, when a temperature lies in an operating range of under 120° C., under 110° C., under 100° C., under 90° C., or under 80° C., the temperature compensation ring can also be manufactured in a two component injection molding from hard and soft components, for example, PA6 (abbreviation of polycaprolactam) and TPE-U (abbreviation of thermoplastic polyurethane elastomer PUR).

In many applications positioning elastomers or temperature compensation rings that are inserted between an axial stop of various support bearings, for example the TABs, can make possible a compensation for increasing bearing clearance by their higher intrinsic elasticity with temperature changes. This increased bearing clearance can occur, for example, with a heating transmission housing, made from aluminum or other light metals, with respect to a steel. Under certain circumstances the bearing clearance of the support bearings used can thereby be made much smaller, which can possibly make possible a more secure operation. It has been shown in experiments that due to material loss the temperature compensation rings can lose their function in a transition to the fits. With the temperature compensation ring according to exemplary embodiments this wear can at least be reduced. However, the bearing can not only be a tapered roller bearing as described for FIG. 1, but also all other possible bearings, ball bearings, angular contact ball bearings, cylindrical roller bearings, spherical roller bearings, or the like.

The exemplary embodiments and their individual features disclosed in the above description, the following claims, and the accompanying Figures can be meaningful and implemented both individually and in any combination for the realization of an exemplary embodiment in its various designs. In some further exemplary embodiments, features that are disclosed in other exemplary embodiments as device features can also be implemented as method features. Furthermore, features that are implemented in some exemplary embodiments as method features can also optionally be implemented in other exemplary embodiments as device features.

Moreover, combinations of features and steps disclosed in the above detailed description may not be necessary to practice the invention in the broadest sense, and are instead taught merely to particularly describe representative examples of the invention. Furthermore, various features of the above-described representative examples, as well as the various independent and dependent claims below, may be combined in ways that are not specifically and explicitly enumerated in order to provide additional useful embodiments of the present teachings.

All features disclosed in the description and/or the claims are intended to be disclosed separately and independently from each other for the purpose of original written disclosure, as well as for the purpose of restricting the claimed subject matter, independent of the compositions of the features in the embodiments and/or the claims. In addition, all value ranges or indications of groups of entities are intended to disclose every possible intermediate value or intermediate entity for the purpose of original written disclosure, as well as for the purpose of restricting the claimed subject matter.

REFERENCE NUMBER LIST

1 Temperature compensation ring
2 Component
3 Component
4 Base body
5 Surface
6 Abutment surface
7 Raceway
8 Flange
9 Section
10 End surface
11 Cutout
12 Radially inwardly facing surface
13 Groove
14 Groove
15 Groove
16 Gap
17 Radially inwardly facing surface
18 Gap
19 Groove
20 Groove
21 Groove
22 End edge
23 End edge
30 Temperature compensation ring
32 Base body
31 Strengthening body
33 Side surface
34 Side surface
35 First winding
36 Second winding
37 End side
38 Third winding
39 Surface
40 Fourth winding
41 Fifth winding
42 End side
43 End side
50 Temperature compensation ring
60 Temperature compensation ring
61 Strengthening body
62 Strengthening body
63 Recess
64 Base body
65 Recess
M Axial direction

What is claimed is:

1. A temperature compensation ring configured to compensate for a temperature-dependent distance change between two components, comprising:
a base body made from an elastic material;
wherein at least a section of at least one surface of the base body includes at least one groove configured to receive a lubricant to reduce a friction in an axial direction between the temperature compensation ring and an abutment surface on which the temperature compensation ring is mountable.

2. The temperature compensation ring according to claim 1, wherein the at least one groove is disposed at least in a region at which a gap arises in an assembled state between a bearing ring and a housing at which the bearing ring is disposed.

3. The temperature compensation ring according to claim 2, wherein the at least one groove is disposed on a surface facing in the radial direction.

4. The temperature compensation ring according to claim 3, wherein the at least one groove is disposed inside a section in the axial direction that extends away in the axial direction from an end surface of the temperature compensation ring less than 30% of a total extension of the temperature compensation ring or wherein at least two grooves are disposed spaced from one another in the axial direction.

5. The temperature compensation ring according to claim 1, further including at least one strengthening body manufactured from a harder material than a material of the base body and wherein the at least one groove is disposed in the strengthening body.

6. The temperature compensation ring according to claim 5, wherein the at least one strengthening body is manufactured from a metallic material and wherein the strengthening body is configured to partially form opposing side surfaces of the temperature compensation ring.

7. The temperature compensation ring according to claim 5, wherein the strengthening body is a spring whose windings are disposed in the circumferential direction.

8. The temperature compensation ring according to claim 1, wherein the at least one groove comprises a first groove having a first depth and a first axial width and a second groove having a second depth and a second axial width, wherein the first depth is substantially equal to the second depth and the first axial width is greater than the second axial width.

9. The temperature compensation ring according to claim 1, wherein the at least one groove comprises a first groove having a first depth and a first axial width and a second groove having a second depth and a second axial width, wherein the first axial width is substantially equal to the second axial width and the first depth is substantially equal to the second depth.

10. The temperature compensation ring according to claim 1, wherein a first portion of the outer surface has a first coefficient of friction with an abutment surface on which the temperature compensation ring is mountable and a second portion of the outer surface of the base body is covered with a layer of material having a second coefficient of friction with the abutment surface, the second coefficient of friction being lower than the first coefficient of friction.

11. A temperature compensation ring configured to compensate for a temperature-dependent distance change between two components, comprising:
a base body made from an elastic material, the base body having an outer surface,
wherein a first portion of the outer surface has a first coefficient of friction with an abutment surface on which the temperature compensation ring is mountable and a second portion of the outer surface of the base body is covered with a layer of material having a second coefficient of friction with the abutment surface, the second coefficient of friction being lower than the first coefficient of friction.

12. The temperature compensation ring according to claim 11, wherein the layer of material comprises a coating disposed at least in a region at which a gap arises in an assembled state between a bearing ring and a housing at which the bearing ring is disposed.

13. The temperature compensation ring according to claim 12, wherein the coating is disposed on a surface facing in a radial direction.

14. The temperature compensation ring according to claim 13, wherein the coating is disposed inside a section in the axial direction that extends away in the axial direction from an end surface of the temperature compensation ring less than 30% of a total extension of the temperature compensation ring or wherein at least two coating sections are disposed spaced from one another in the axial direction.

15. The temperature compensation ring according to claim 11, further including at least one strengthening body manufactured from a harder material than a material of the base body and wherein the at least one groove is disposed in the strengthening body.

16. The temperature compensation ring according to claim 15, wherein the at least one strengthening body is manufactured from a metallic material and wherein the strengthening body is configured to partially form opposing side surfaces of the temperature compensation ring.

17. The temperature compensation ring according to claim 15, wherein the strengthening body is a spring whose windings are disposed in the circumferential direction.

18. A temperature compensation ring configured to compensate for a temperature-dependent distance change between two components, comprising:
a base body made from an elastic material;
groove means in at least one surface of the base body for receiving a lubricant for reducing a friction in an axial direction between the temperature compensation ring and an abutment surface on which the temperature compensation ring is mountable.

* * * * *